United States Patent
Fukumoto

(10) Patent No.: US 11,378,425 B2
(45) Date of Patent: Jul. 5, 2022

(54) MEASUREMENT APPARATUS UNIT

(71) Applicant: DENSO CORPORATION, Kariya (JP)

(72) Inventor: Harutsugu Fukumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/161,451

(22) Filed: Jan. 28, 2021

(65) Prior Publication Data

US 2021/0239497 A1 Aug. 5, 2021

(30) Foreign Application Priority Data

Jan. 31, 2020 (JP) .............................. JP2020-014741
Dec. 3, 2020 (JP) .............................. JP2020-200778

(51) Int. Cl.
*G01D 11/30* (2006.01)
*G01D 11/24* (2006.01)

(52) U.S. Cl.
CPC .......... *G01D 11/30* (2013.01); *G01D 11/245* (2013.01)

(58) Field of Classification Search
CPC .............................. G01D 11/30; G01D 11/245
See application file for complete search history.

(56) References Cited

U.S. PATENT DOCUMENTS

| | | | | |
|---|---|---|---|---|
| 7,218,745 B2* | 5/2007 | McConnell | ......... | B60R 11/0235 381/152 |
| 8,817,576 B2* | 8/2014 | Tsuzuki | ........... | G01S 7/521 367/121 |
| 10,099,630 B1* | 10/2018 | Krishnan | ............ | B60Q 1/0023 |
| 10,359,303 B1* | 7/2019 | Krishnan | ............... | B60R 11/00 |
| 10,514,303 B2* | 12/2019 | Krishnan | ............... | G01K 1/08 |
| 10,597,089 B2* | 3/2020 | Ghannam | .............. | B62D 25/06 |
| 10,829,058 B2* | 11/2020 | Fan | ........................ | B60R 11/04 |
| 10,908,002 B2* | 2/2021 | Robertson, Jr. | ....... | H04N 5/2254 |
| 10,981,518 B1* | 4/2021 | Krishnan | ............... | E05F 15/73 |
| 2011/0242942 A1* | 10/2011 | Tsuzuki | .............. | H01R 13/405 367/121 |
| 2013/0278715 A1* | 10/2013 | Nutsch | .............. | H04N 5/23238 348/38 |
| 2016/0282468 A1* | 9/2016 | Gruver | .................. | G01S 7/4815 |
| 2017/0305360 A1* | 10/2017 | Zajac | ........................ | G01C 3/08 |
| 2018/0011173 A1* | 1/2018 | Newman | ................. | G01S 7/497 |
| 2018/0037267 A1* | 2/2018 | Williams | ................ | B60R 11/04 |
| 2018/0219878 A1* | 8/2018 | Hirshberg | ............... | G06F 15/16 |
| 2018/0257582 A1* | 9/2018 | Fan | ....................... | G01S 7/4813 |
| 2021/0146406 A1* | 5/2021 | Sykula | .................... | B08B 5/02 |
| 2021/0227104 A1* | 7/2021 | Krishnan | ............ | E05B 47/0002 |

FOREIGN PATENT DOCUMENTS

JP 2012-181147 A 9/2012

\* cited by examiner

*Primary Examiner* — Jamel E Williams
(74) *Attorney, Agent, or Firm* — Maschoff Brennan

(57) ABSTRACT

A measurement apparatus unit is mounted to a vehicle. The measurement apparatus unit includes a base and a plurality of detection modules. The plurality of detection modules are mounted to the base. Each of the plurality of detection modules includes a casing and a detector. The detector is housed in the casing. The casing includes a mounting portion for detachably mounting each of the plurality of detection modules to the base. The mounting portion has a shape that is common among the plurality of detection modules.

19 Claims, 7 Drawing Sheets

MEASUREMENT APPARATUS UNIT

CROSS-REFERENCE OF RELATED APPLICATIONS

This application is based on and claims the benefit of priority from Japanese Patent Application No. 2020-014741, filed on Jan. 31, 2020, and Japanese Patent Application No. 2020-200778, filed on Dec. 3, 2020, the descriptions of which are incorporated herein by reference.

BACKGROUND

Technical Field

The present disclosure relates to a measurement apparatus unit that is mounted to a vehicle.

Related Art

Various types of detectors, that is, sensors are mounted to a vehicle. These sensors receive power supply and output detection signals through connector portions.

SUMMARY

One aspect of the present disclosure provides a measurement apparatus unit that is mounted to a vehicle. The measurement apparatus unit includes a base and a plurality of detection modules. The plurality of detection modules are mounted to the base. Each of the plurality of detection modules includes a casing and a detector. The detector is housed in the casing. The casing includes a mounting portion for detachably mounting each of the plurality of detection modules to the base. The mounting portion has a shape that is common among the plurality of detection modules.

DESCRIPTION OF THE EMBODIMENTS

Various types of detectors, that is, sensors that are mounted to a vehicle receive power supply and output detection signals through connector portions (JP-A-2011-209234). In addition, techniques for modifying appearance and design based on arrangement positions of various sensors have been proposed (JP-A-2012-181147).

However, in a driving assistance system, because a plurality of sensors are used, shapes of sensor casings and connector shapes are wide-ranging. As a result, an issue arises in that a sensor that is of a type that is based on vehicle type or intended purpose cannot be easily mounted. In addition, an issue arises in that a sensor cannot be easily attached/detached when the sensor is required to be attached/detached for maintenance or when a malfunction occurs.

It is thus desired to enable a detector to be mounted to a vehicle regardless of a shape and type of the detector.

The present disclosure may be implemented according to the following embodiments.

An exemplary embodiment of the present disclosure provides a measurement apparatus unit that is mounted to a vehicle. The measurement apparatus unit includes a base and a plurality of detection modules. The plurality of detection modules are mounted to the base. Each of the plurality of detection modules includes a casing and a detector. The detector is housed in the casing. The casing includes a mounting portion for detachably mounting each of the plurality of detection modules to the base. The mounting portion has a shape that is common among the plurality of detection modules.

As a result of the measurement apparatus unit according to the exemplary embodiment, a detector can be mounted to a vehicle regardless of a shape or type of the detector.

Several embodiments of the present disclosure, which provides a measurement apparatus unit that is mounted to a vehicle, will be hereinafter described with reference to the drawings.

First Embodiment

Figure 1:
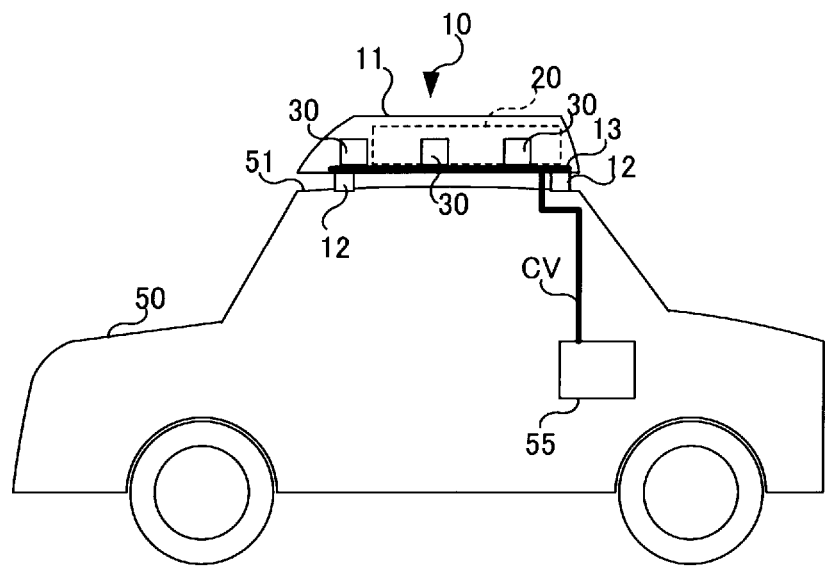
FIG. 1 is an explanatory diagram of an example of a vehicle to which a measurement apparatus unit according to a first embodiment is mounted.

As shown in FIG. 1, a measurement apparatus unit 10 according to a first embodiment is mounted to a roof 51 of a vehicle 50. The measurement apparatus unit 10 includes at least a base 13 and a plurality of detection modules 30. The measurement apparatus unit 10 may include a main body 20, and an outer plate 11 that covers at least a part of the base 13, the main body 20, and the detection modules 30.

Figure 2:
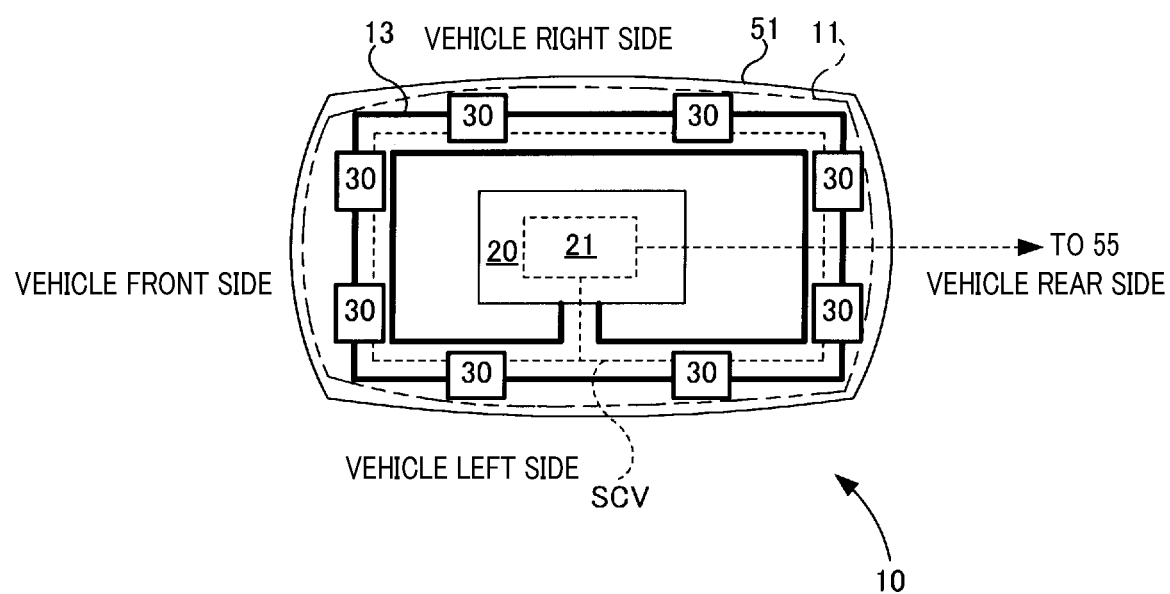
FIG. 2 is a plan view schematically illustrating the measurement apparatus unit according to the first embodiment that is mounted to a roof of vehicle.

As shown in FIG. 2, the main body 20 includes a data processing apparatus 21, therein. The data processing apparatus 21 performs data processing to generate integrated data by integrating detection data that is inputted from each detection module 30. The data processing apparatus 21 is connected to a vehicle control apparatus 55 by wiring CV. The vehicle control apparatus 55 is provided inside the vehicle 50.

The measurement apparatus unit 10 may further include a fixing mechanism 12 for fixing the base 13 to the roof 51. For example, the fixing mechanism 12 may be a mounting mechanism for mounting the base 13 to a roof rail that is provided on the roof 51. Alternatively, the fixing mechanism 12 may be a mounting mechanism that is mounted between the roof 51 and an upper portion of a door. For example, the base 13 may be directly fixed to the roof in a manner similar to the roof rail.

The outer plate 11 and the main body 20 may be partly or entirely made of a nonmetallic material (non-metal material), such as reinforced resin or carbon fiber. Alternatively, the outer plate 11 and the main body 20 may be partly or entirely made of a metallic material (metal material), such as an aluminum material or stainless steel. The outer plate 11 includes an opening portion in which a detection surface of the detection module 30 is exposed, or a window portion that is made of resin or glass that allows transmission of detection light or detection waves.

A specific example in which the measurement apparatus unit 10 is mounted to the vehicle 50 will be described with reference to FIG. 2.

The base 13 is arranged in a quadrangular shape along a front side, a rear side, a left side, and a right side of the roof 51 that respectively correspond to directions that are ahead, to the rear, to the left, and to the right of the vehicle 50. Here, the left side and the right side of the roof 51 can also be referred to as the sides of the roof 51.

For example, the base 13 may be configured by sub bases of four sides that are a front side portion, a rear side portion, a left side portion, and a right side portion being directly connected. Alternatively, the base 13 may be configured by the sub bases being indirectly connected by corner portions. Moreover, rather than the sub bases being used, the base 13 may be configured such that the front side, the rear side, the left side, and the right side are integrally formed.

The plurality of detection modules 30 are mounted on the front, rear, left, and right of the base 13, that is, the front side, the rear side, the left side, and the right side. The main body 20 is arranged in a center portion of the base 13. The main body 20 may be mounted and fixed to the base 13 in a manner similar to the detection modules 30. Alternatively, the main body 20 may be mounted and fixed to a main body base that is separate from the base 13 and connected to the base 13.

Detailed configurations of the base 13 and the detection module 30 will be described with reference to FIG. 3 and FIG. 4.

The detection module 30 includes a casing 31, a connecting portion 32, and a detector 40. The detector 40 is housed inside the casing 31. The casing 31 has an overall polyhedral shape, such as a rectangular parallelepiped or a hexahedron. The casing 31 may be made of a nonmetallic material such as reinforced resin or carbon fibers, a metallic material such as an aluminum material or stainless steel, or a combination of a nonmetallic material and a metallic material.

Here, when the nonmetallic material is used, to reduce or prevent effects of electromagnetic waves on the detector 40, a metal coating is preferably applied to a surface of the casing 31. The casing 31 may be selected from among casings 31 of shapes and dimensions that are prepared in advance, based on a size of the detector 40 that is contained therein. The detector 40 is arranged inside the casing 31 such that a desired optical axis is provided when the detection module 30 is mounted to the base 13 at an attitude that is prescribed in advance.

The attitude refers to a mounting position and upward/downward/leftward/rightward orientation of the detection module 30. The optical axis refers to a detection axis that corresponds to a center of detection data in the case of a detector that does not use light.

The casing 13 has a concave portion over a surface that is continuous with a single or a plurality of surfaces that oppose the base 13. The concave portion serves as a mounting portion 311 for detachably mounting the detection module 30 to the base 13. Here, the mounting portion 311 refers to a plurality of surfaces or a portion of the casing 31 that prescribes a concave space, or the concave space.

For example, when the casing 31 is substantially a rectangular parallelepiped, the mounting portion 311 is formed over a single opposing surface of the casing 31 that opposes the base 13 and two side surfaces that are continuous with the opposing surface. That is, the side surfaces of the casing 31 form a substantially C-like shape. When a direction of the casing 13 that is parallel to the base 13 is referred to as a width, the casing 31, that is, the opposing surface has a width dimension W1.

According to the present embodiment, the mounting portion 311 has a shape that is common among the detection modules 30. That is, even if types of detectors 40, and shapes and dimensions of the casings 31 contained in the detection modules 30 differ, the mounting portion 311 has a common shape. The shape refers to dimensions and outer shape. A common shape refers to the dimensions and outer shape being common. In other words, the common shape means that the shape is compatible with an outer shape and dimensions of a mounted portion 131 of the base 13, described hereafter.

The type of detector 40 refers to a type of measurement method or a type of product among detectors 40 that use the same measurement method. As a result, differences in classifications and types among individual detectors 40 can be absorbed, and an arbitrary detection module 30 can be mounted to an arbitrary mounted portion 131 of the base 13. Here, in addition to the mounting portion 311, the shape of the casing 31 may also be common among the detection modules 30.

In this case, the outer appearance of the measurement apparatus unit 10 can be unified. In addition to improvement in design, aerodynamic performance and measurement performance of the measurement apparatus unit 10 can be improved because unevenness due to differences in shape of the detection modules 30 is suppressed.

The connecting portion 32 extends towards the base 31 from the opposing surface of the mounting portion 311 that opposes the base 31. The connecting portion 32 is configured to prescribe a position of the detection module 30 in relation to the base 13.

A dimension in a depth direction and a dimension in a height direction of the mounting portion 311 that is orthogonal to the width direction can be determined as appropriate based on the mounting position in the base 13. However, to reduce or prevent rattling after mounting, the depth dimension and the height dimension of the mounting portion 311 are preferably dimensions that approximate the dimensions of the mounting position in the base 13.

According to the present embodiment, a substantially plate-like shape is used for the connecting portion 32.

However, the connecting portion 32 may have another shape, such as a substantially columnar shape. The connecting portion 32 may further include a mechanism or a configuration for fixing the detection module 30 to the base 13. In addition, the connecting portion 32 includes a terminal 321 that is made of a single or a plurality of conductive materials and electrically connected to the detector 40.

When the connecting portion 32 has the plate-like shape, the terminal 321 may be arranged on a plane surface or a bottom surface. Here, the terminal 321 may have at least any shape among a plurality of connection pins, a plurality of connection springs, and a plurality of connection surfaces. Furthermore, the connecting portion 32 includes an engaging portion 317 that engages the detection module 30 with the base 13 and fixes the detection module 30 to the base 13.

For example, an arrangement position of the engaging portion 317 may be each surface of the connecting portion 32 that corresponds to a plane surface and a bottom surface of the base 13. A plurality of types of detectors that differ in measurement methods, such as a camera, a Lidar (light detection and ranging), a millimeter-wave radar, and an ultrasonic sensor, can be used as the detectors 40. The detector 40 receives power through the connecting portion 32 and outputs detection data through the connecting portion 32.

According to the present embodiment, the connecting portion 32 has a structure that is common among each type of the detectors 40 that are contained in the detection modules 30. A structure that is common includes the shape and dimensions of the connecting portion 32, and furthermore, the type, shape, and arrangement position of the terminal 133.

The connecting portion 32 may further have a structure that is common among all types of detectors 40. In this case, differences in connection structures accompanying differences in the types of the detectors 40 can be absorbed in the detection module 30. Common modularization, that is, standardization of the detection module 30 can be implemented.

The base 13 has a frame structure that is solid or hollow, and has a polygonal or circular cross-section. According to the present embodiment, as shown in FIG. 3 and FIG. 4, the base 13 that has a hollow frame structure that is hollow and has a rectangular cross-section is used. FIG. 3 shows a portion of a single unit of the base 13. The base 13 includes the mounted portion 131, a connected portion 132, and an engaged portion 137. The mounted portion 131 is a portion to which the detection module 30, that is, the mounting portion 311 of the detection module 30 is mounted.

Figure 3:
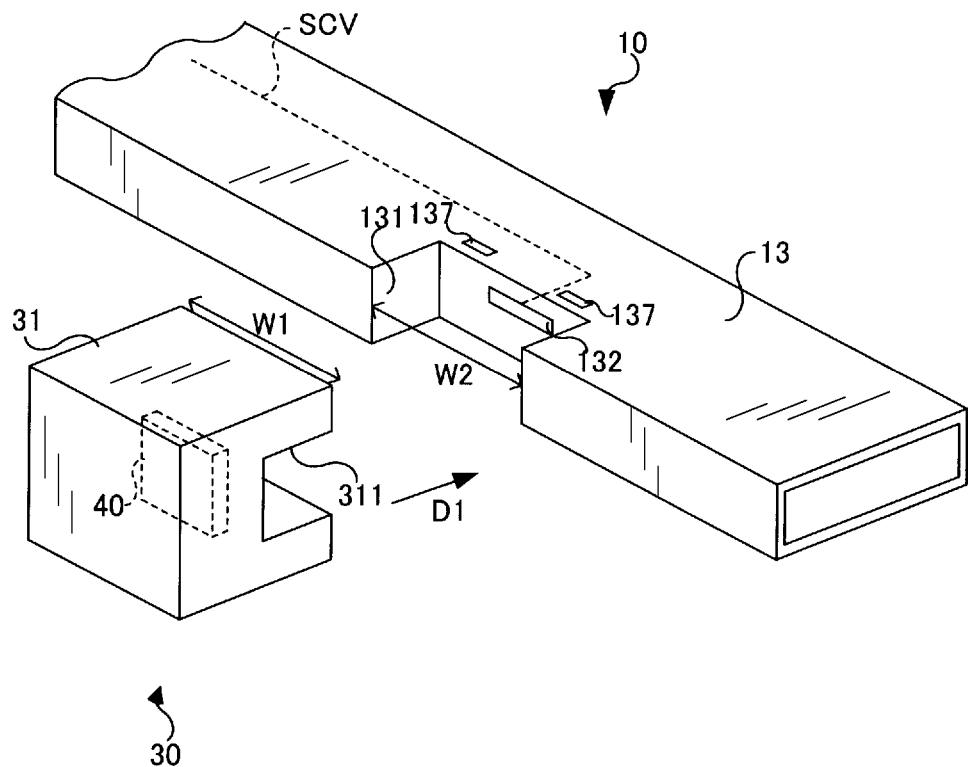
FIG. 3 is a perspective view schematically illustrating a base and a detection module according to the first embodiment.
Figure 4:
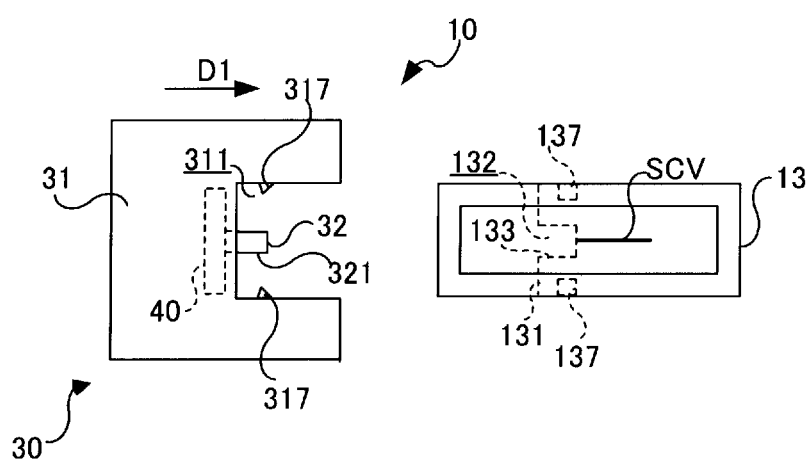
FIG. 4 is a side view schematically illustrating the base and the detection module according to the first embodiment.

In the example in FIG. 3 and FIG. 4, the mounted portion 131 is formed as a concave portion that has a width dimension W2 that corresponds to the width dimension W1 of the detection module 30 that is mounted. As a result of the mounted portion 131 having a concave shape, primary positioning of the detection module 30 is facilitated. In addition, together with the mounting portion 311 of the detection module 30 that has a concave shape, a dimension in a mounting direction D1 when the detection module 30 is mounted can be reduced.

Here, the mounted portion 131 is merely required to roughly indicate the mounting position of the detection module 30. The width dimension W2 may be sufficiently greater than the width dimension W1 of the detection module 30. In addition, a dimension in a depth direction and a dimension in a height direction of the mounted portion 131 that are orthogonal to the width direction can be determined as appropriate based on strength required of the base 13 and a size of an arrangement space of the measurement apparatus unit 10. Wiring SCV that is used for at least either of communication with the detection module 30 and power supply to the detection module 30 is arranged inside the base 13, that is, the hollow portion of the base 13.

When the measurement apparatus unit 10 is provided with the main body 20, together with the base 13, the wiring SCV is connected to the data processing apparatus 21 inside the main body 20. When the measurement apparatus unit 10 is not provided with the main body 20, the wiring SCV can be connected to the vehicle control apparatus 55 that is provided in the vehicle 50.

The base 13 may be made of a nonmetallic material such as reinforced resin or carbon fiber, a metallic material such as an aluminum material or stainless steel, or a combination of a nonmetallic material and a metallic material. Here, when the nonmetallic material is used, to reduce or prevent effects of electromagnetic waves on the wiring SCV, a metal coating is preferably applied to a surface of the base 13.

The connected portion 132 is configured such that the connecting portion 32 of the detection module 30 is connected thereto. The connected portion 132 is a concave portion that corresponds to the shape of the connecting portion 32. The connected portion 132 has a terminal 133 that is made of a conductive material and connected to the wiring SCV. The terminal 133 is merely required to be arranged on at least one inner wall surface among inner wall surfaces of the detection module 30 that are parallel to the mounting direction D1.

For example, the terminal 133 may be arranged on at least either of a ceiling surface and a bottom surface of the connected portion 132. The connected portion 132 has dimensions, particularly a dimension in a normal direction of the terminal 133, that enable firm holding or fitting of the connecting portion 32 to provide electrical connection between the terminal 133 and the terminal 321 of the connecting portion 32.

Here, the position of the terminal 321 in the connecting portion 32 and the position of the terminal 133 in the connected portion 132 are merely required to correspond to each other, and can be determined as appropriate based on the shapes of the connecting portion 32 and the connected portion 132.

The terminal 133 may be a plurality of connection holes, a plurality of connection surfaces, a plurality of connection springs or a plurality of connection pins that connect or engage with the plurality of connection pins, the plurality of connection springs, or the plurality of connection surfaces provided in the terminal 321.

The connected portion 132 may further be used to prescribe the mounting position of the detection module 30, or more specifically, the optical axis of the detection module 30. According to the present embodiment, the connected portion 132 has a connection structure that is common among each type of the detectors 40.

The detection modules 30 that contain therein the same type of detectors 40 can be mounted to arbitrary mounted portions 131 of the base 13. Furthermore, the connected portion 132 may have a connection structure that is common among all detectors 40. In this case, regardless of the type of detector 40 that is contained therein, the detection module 30 can be mounted to an arbitrary mounted portion 131 of the base 13.

Here, the connection structure refers to, in addition to the dimensions of the connected portion 132, the shape and arrangement position of the terminal 133, and a terminal type such as a power terminal or a data terminal. When the connecting portion 32 has the terminal 321 in a differing position based on the detector 40, a plurality of terminals 133 may be arranged in correspondence to the terminals 321.

In this case, even in cases in which the detection modules 30 have the connecting portions 32 that have differing terminal arrays for differing types of detectors 40, the difference can be absorbed on the base 13 side. The detection module 30 can be mounted to an arbitrary mounted portion 131 of the base 13.

The engaged portion 137 is a concave portion for receiving the engaging portion 317 of the detection module 30. For example, the engaged portion 137 may have a shape that facilitates engagement of the engaging portion 317 in the mounting direction of the detection module 30 and restricts disengagement of the engaging portion 317 in a removal direction of the detection module 30, based on the shape of the engaging portion 317.

The positions of the engaging portion 317 and the engaged portion 137 may be any position in the width direction of the detection module 30. In addition, quantities of the engaging portions 317 and the engaged portions 137 are arbitrary. However, two or more engaging portions 317 and two or more engaged portions 137 are preferably provided to reduce or prevent shifts in mounting of the detection module 30 in the horizontal direction that is orthogonal to the mounting direction.

Figure 5:
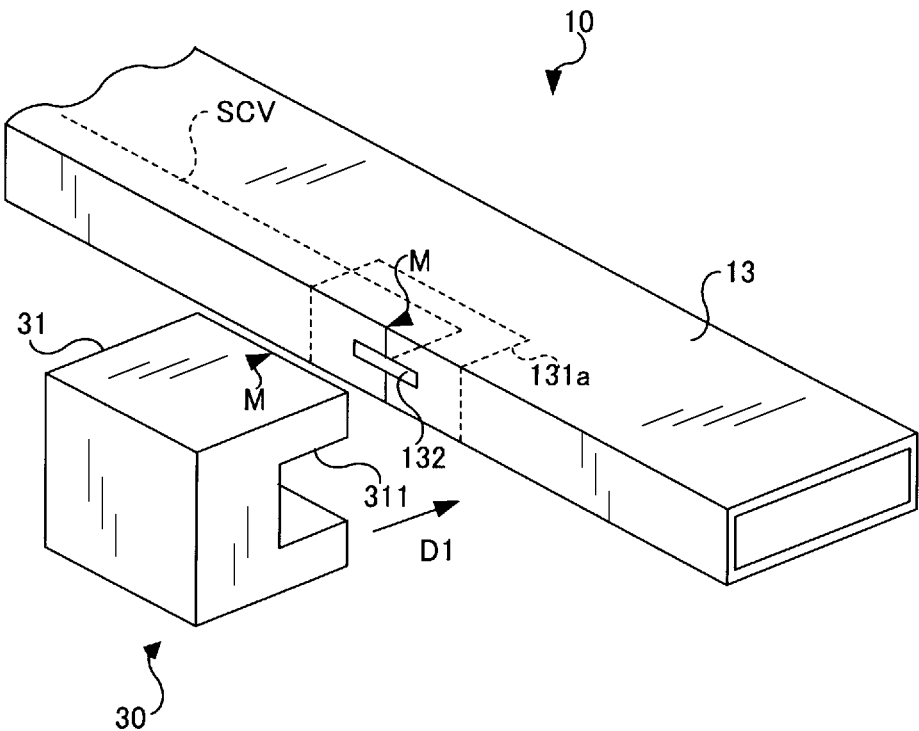
FIG. 5 is an explanatory diagram schematically illustrating another mode of the base according to the first embodiment.

Another mode of the base 13 will be described with reference to FIG. 5.

The base 13 shown in FIG. 3 and FIG. 4 has the mounted portion 131 that is formed into a concave shape. In contrast, according to another mode, the base 13 differs in that a mounted portion 131a that is not formed into a concave shape is provided. Here, other configurations are similar to those of the base 13 shown in FIG. 3 and FIG. 4.

Therefore, same reference numbers are given and descriptions are thereby omitted. In addition, a part of the configurations are omitted in the drawing. For example, in a case in which positioning indicators M for positioning the detection module 30 in relation to the base 13 during mounting are provided on both the base 13 and the detection module 30, the connecting portion 32 of the detection module 30 can be smoothly connected to the connected portion 132.

Figure 6:
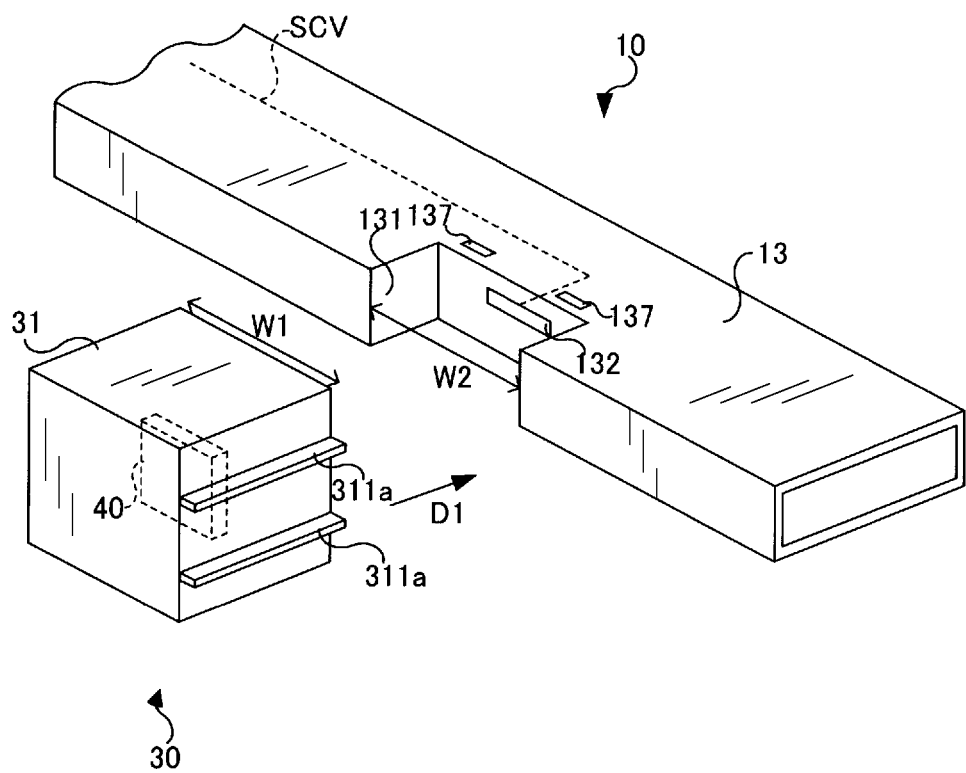
FIG. 6 is an explanatory diagram schematically illustrating another mode of the detection module according to the first embodiment.

In addition, when dimensional tolerance of the detection module 30 in the mounting direction D1 is high, the concave mounted portion 131 is no longer needed to be formed in the base 13. Furthermore, as shown in FIG. 6, instead of the concave mounting portion 311 being formed in the casing 31 of the detection module 30, a protruding mounting portion 311a may be formed or arranged on a side surface of the casing 31.

Furthermore, instead of the protruding mounting portion 311a, a concave mounting portion may be formed on a side surface of the casing 31. In any case, mounting and positioning of the detection module 30 to the base 13 are facilitated. In FIG. 5 and FIG. 6, a portion of a single unit of the base 13 is shown.

In the measurement apparatus unit 10 according to the first embodiment, the detection module 30, that is, the casing 31 includes the mounting portion 311 that has a common shape. Therefore, the detector 40 can be mounted to the vehicle 50 regardless of the shape and type of the detector 40.

That is, the detector 40 is contained in the casing 31, and the detection module 30 is mounted to the base 13 that is arranged on the vehicle 50 by the mounting portion 311 that has the common shape. Therefore, even when the shape of the casing 31 differs depending on the detector 40 that is contained, the detector 40 can be mounted to the vehicle 50 regardless of the shape and type of the detector 40.

In addition, when casings 31 that have the same shape are selected regardless of the differences in the types of detectors 40, design and technical characteristics of the measurement apparatus unit 10 can be enhanced. That is, through use of the detection module 30 that includes the common casing 31, uniformity of the measurement apparatus unit 10 can be improved. Aerodynamic performance and measurement performance can be improved.

In the measurement apparatus unit 10 according to the first embodiment, the base 13 includes the wiring SCV therein. Therefore, degradation of the wiring SCV as a result of external environment, such as ultraviolet rays, atmospheric air, and moisture, can be suppressed or prevented. In addition, when the base 13 is made of metal or a metal coating is applied to the surface of the base 13, the wiring SCV can be protected from the effects of electromagnetic waves.

Furthermore, because the wiring SCV is directly connected to the terminal 133, and electrical connection between the wiring SCV and the detector 40 is provided through the connected portion 132 and the connecting portion 32, attachment/detachment of the wiring SCV during attachment/detachment of the detection module 30 is unnecessary. Attachment/detachment of the detection module 30 can be facilitated.

The detector 40 is arranged in the detection module 30 such that the optical axis is suitably oriented when the detection module 30 is mounted to the base 13 in an attitude that is prescribed in advance. Therefore, in the measurement apparatus unit 10 according to the first embodiment, the optical axis of the detector 40 can be set to a suitable orientation as a result of an operation for mounting the detection module 30 to the base 13. Attachment/detachment of the detector 40 including optical axis adjustment can be facilitated.

According to the above-described embodiment, suitable optical axis adjustment is exclusively implemented by the engagement between the connected portion 132 and the connecting portion 32. To further improve accuracy of the optical axis adjustment, an engaged mechanism and an engaging mechanism that engage with each other may be provided in the mounted portion 131 of the base 13 and the mounting portion 311 of the detection module 30.

For example, the engaged mechanism and the engaging mechanism may be provided by a groove portion and a protruding portion being formed. Alternatively, the shapes of the mounted portion 131 and the mounting portion 311 themselves may be formed into shapes that engage with each other.

In the description above, the base 13 is arranged on the roof 51 of the vehicle 50. In this regard, for example, the base 13 may be arranged in a location other than the roof 51, such as a hood or a trunk lid of the vehicle 50. In this case as well, technical effects similar to the technical effects achieved according to the first embodiment can be achieved.

In the description above, the connected portion 132 and the connecting portion 32 respectively include the contact-type terminals 133 and 321. However, the connected portion 132 and the connecting portion 32 may be connected in a contactless manner. Here, in this case, connection refers to a state that enables transmission and reception of data and power supply.

For example, contactless connection may include electromagnetic connection through electromagnetic couplers and optical connection by photocouplers. When a contactless method is used, water resistance and dust resistance of the connected portion 132 and the connecting portion 32 can be easily ensured. On the other hand, when the contact-type terminals 133 and 321 are used, the connected portion 132 and the connecting portion 32 preferably include publicly known water-resistant and dust-resistant structures.

As a result of the water-resistant and dust-resistant structure being provided, infiltration of rainwater, atmospheric dust, and the like into the interior of the base 13 can be prevented. Degradation of the wiring SCV can be suppressed. In addition, electrical short circuiting can be prevented.

Second Embodiment

A measurement apparatus unit according to a second embodiment further includes an optical axis regulating portion and a lock mechanism.

The optical axis regulating portion facilitates actualization of optical axis adjustment of the detector 40. The lock mechanism prevents the detection module 30 from being removed from the base 13. Other configurations of the measurement apparatus unit according to the second embodiment are similar to those of the measurement apparatus unit 10 according to the first embodiment.

Therefore, the same reference numbers are given and descriptions are omitted. Configurations for the optical axis regulating portion and the lock mechanism according to the second embodiment can be applied to the measurement apparatus unit 10 according to the first embodiment. Here, a portion of the base 13 is shown in FIG. 7 to FIG. 11, below, to facilitate description.

Figure 7:
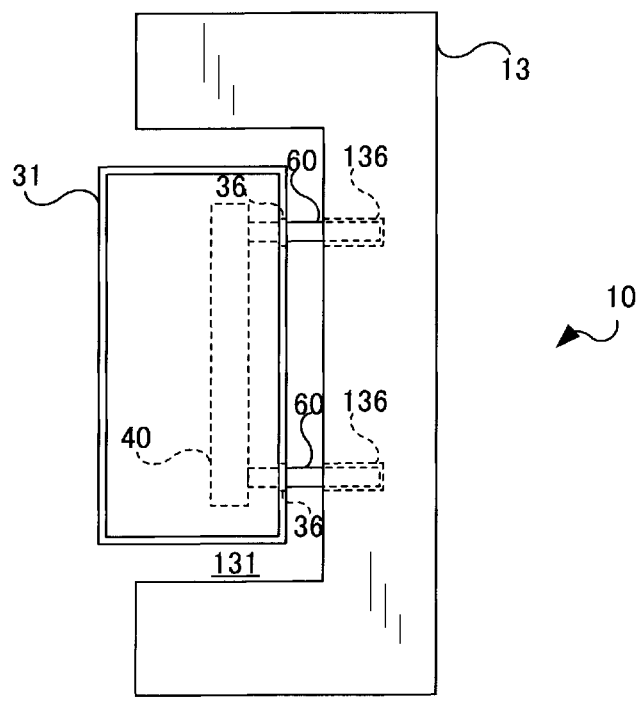
FIG. 7 is an explanatory diagram schematically illustrating an optical axis regulating portion in a first example according to a second embodiment.

In a first example shown in FIG. 7, the detector 40 includes an optical axis pin 60 that is used for optical axis alignment. More specifically, the optical axis pin 60 is arranged on a light receiving substrate that has a light receiving unit or a light emitting substrate that has a light emitting unit that configures the detector 40.

A casing positioning hole 36 through which the optical axis pin 60 passes is formed in the casing 31. A base positioning hole 136 that receives a tip end portion of the optical axis pin 60 is formed in the base 13. The casing positioning hole 36 and the base positioning hole 136 are formed so as to coincide with a suitable optical axis of the detector 40 should have.

Therefore, as a result of the optical axis pin 60 of the detector 40 passing through the casing positioning hole 36 and being received by the base positioning hole 136, the optical axis of the detector 40 that is provided inside the detection module 30 is easily set to a suitable optical axis. The optical axis pin 60, the casing positioning hole 36, and the base positioning hole 136 configure an optical axis regulating portion.

Figure 8:
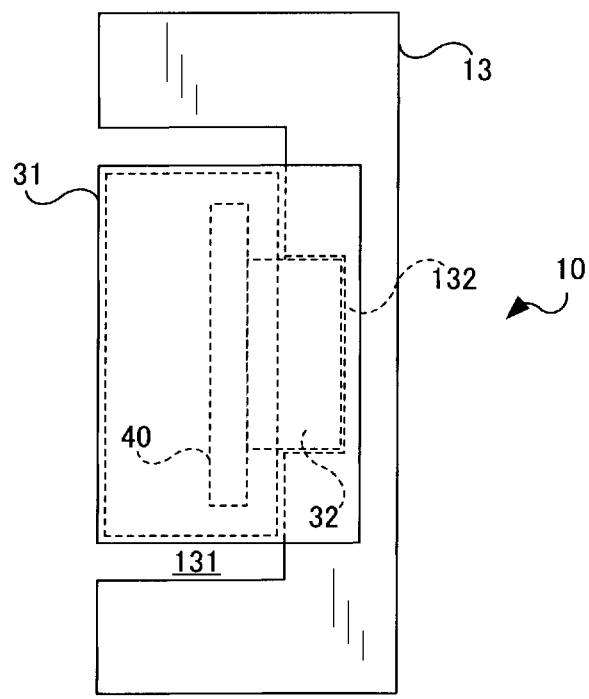
FIG. 8 is an explanatory diagram schematically illustrating the optical axis regulating portion in a second example according to the second embodiment.

In a second example shown in FIG. 8, as described earlier, a suitable optical axis of the detector 40 is set by the connection between the connecting portion 32 and the connected portion 132. The connecting portion 32 is connected to the light receiving substrate or the light emitting substrate, or extended from the light receiving substrate or the light emitting substrate, so as to coincide with the optical axis of the detector 40.

In this case, the optical axis of the detector 40 that is provided inside the detection module 30 is easily set to a suitable optical axis through the connection between the connecting portion 32 and the connected portion 132 that are required for operation of the detection module 30, without the optical axis pin 60 being provided.

Figure 9:
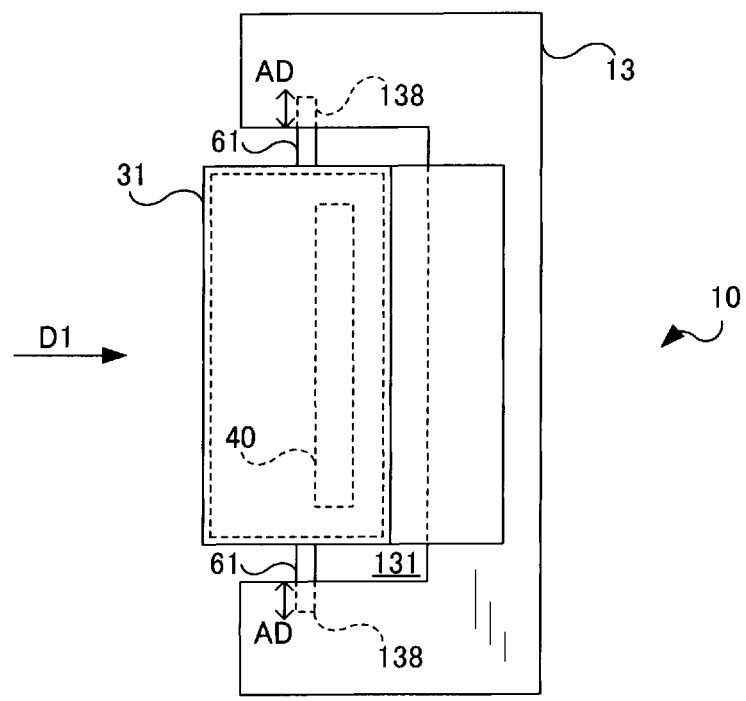
FIG. 9 is an explanatory diagram schematically illustrating a lock mechanism in a third example according to the second embodiment.

In a third example shown in FIG. 9, the detection module 30 includes a lock pin 61 that prevents the detection module 30 from being easily removed from the base 13. A pin receiving hole 61 for receiving the lock pin 61 is provided in the mounted portion 131 of the base 13. For example, the lock pin 61 may be made of a metallic material that has a circular columnar shape or a prismatic shape. The lock pin 61 has a structure that can be extended in an arrow AD direction.

For example, the structure that can be extended may be provided by an elastic body such as a spring, a motor, or an electromagnetic valve. The lock pin 61 is arranged on a surface of the detection module 30, such as a side surface, that is parallel to the mounting direction D1 of the detection module 30. The extending direction of the lock pin 61 intersects the mounting direction D1 of the detection module 30. The pin receiving hole 138 is formed in a position that opposes the lock pin 61 in the mounted portion 131 of the base 13.

Figure 10:
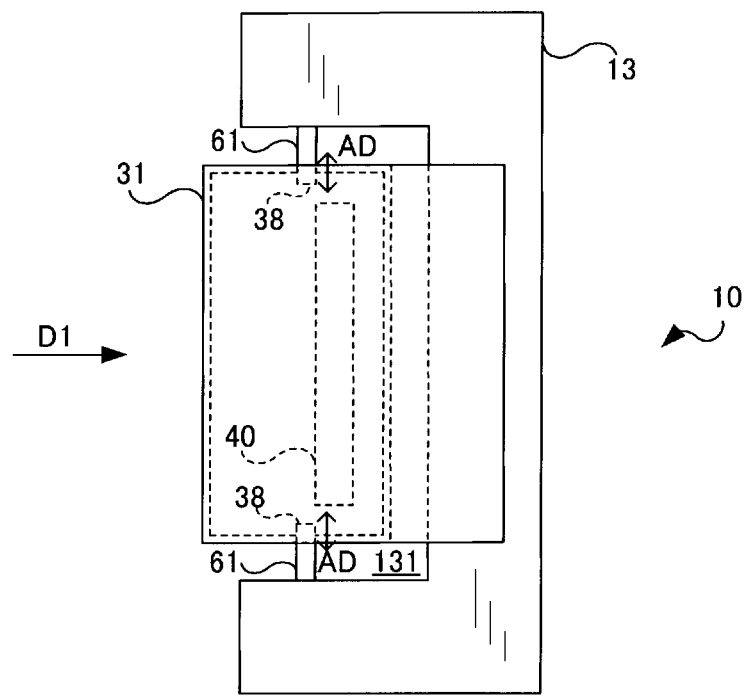
FIG. 10 is an explanatory diagram schematically illustrating the lock mechanism in a fourth example according to the second embodiment.

In a fourth example shown in FIG. 10, the lock pin 61 is provided in the base 13 and prevents the detection module 30 from being easily removed from the base 13. A pin receiving hole 38 for receiving the lock pin 61 is provided in the detection module 30. The lock pin 61 has a configuration that is similar to that in the third example. The lock pin 61 is arranged in the mounted portion 131 of the base 13 so as to correspond to a surface of the detection module 30, such as a side surface, that is parallel to the mounting direction D1 of the detection module 30. The extending direction of the lock pin 61 intersects the mounting direction D1 of the detection module 30. The pin receiving hole 38 is formed in a position that opposes the lock pin 61 in the detection module 30.

In the third example and the fourth example, the lock pin 61 and the pin receiving holes 138 and 38 that configure the lock mechanism are provided. Because the extending direction of the lock pin 61 intersects the mounting direction D1 of the detection module 30, the detection module 30 can be suppressed or prevented from being easily removed from the base 13.

In addition, in a case in which the lock pin 61 is urged by a spring, the lock pin 61 engages with the pin receiving hole 138 or 38 when the lock pin 61 reaches the position of the pin receiving hole 138 or 38 in accompaniment with the mounting of the detection module 30. Therefore, the detection module 30 can be easily locked to the base 13.

Furthermore, when a motor or an electromagnetic valve is used as an actuator that extends the lock pin 61, the actuator is controlled by control signals for locking and unlocking that are transmitted from the vehicle control apparatus 55 through wired or wireless communication. Therefore, the detection module 30 can be removed from the base 13 only when the vehicle control apparatus 55 has been started, that is, generally when a main switch of the vehicle 50 is turned on. The detection module 30 can be prevented from being removed by a third party.

Furthermore, when the lock pin 61 is driven to a non-locking position, that is, a position in which the lock pin 61 does not engage with the pin receiving hole 138 or 38, for example, the vehicle control apparatus 55 may require input of a passcode from an input apparatus such as a navigation apparatus or an information display. As a result, the detection apparatus 30 can be further prevented from being removed.

Other Embodiments (1) According to the above-described embodiments, the connected portion 132 and the connecting portion 32 are configured to engage with each other. However, as shown in FIG. 11, a connected portion 132a and a connecting portion 32 that are not configured to be engaged may be used.

Figure 11:
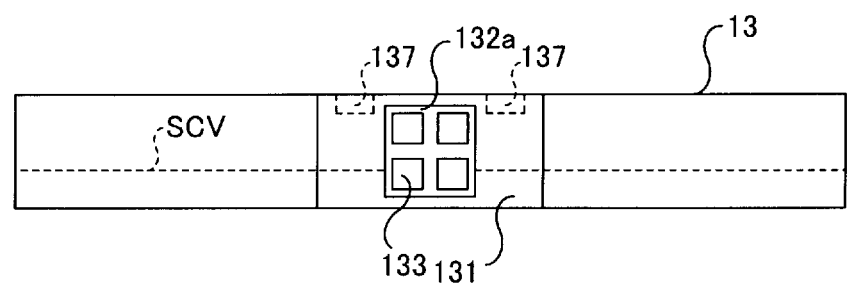
FIG. 11 is an explanatory diagram schematically illustrating a connected portion according to another embodiment.

FIG. 11 shows only the connected portion 132a that is arranged on one of the surfaces of the mounted portion 131 that oppose the detection module 30. In addition, the number of terminals 133 may be determined based on the detector 40. When the connected portion 132a and the connecting portion 32 that are not configured to be engaged are used, the detection module 30 is preferably fixed to the base 13 by the engaged portion 137 and the engaging portion 317 or the lock pin 61. Furthermore, optical axis alignment of the detection module 30, that is, the detector 40 is preferably performed by the optical axis pin 60.

(2) According to the above-described embodiments, as the base 13, the base 13 that has a closed structure that has no open ends and a planar structure in which the base 13 is arranged on a same plane in an up/down direction of the vehicle 50 is used as an example. In this regard, as shown in FIG. 12 and FIG. 13, the base 13 that has a stepped structure in the up/down direction of the vehicle 50, that is, a three-dimensional structure may be used.

Figure 12:
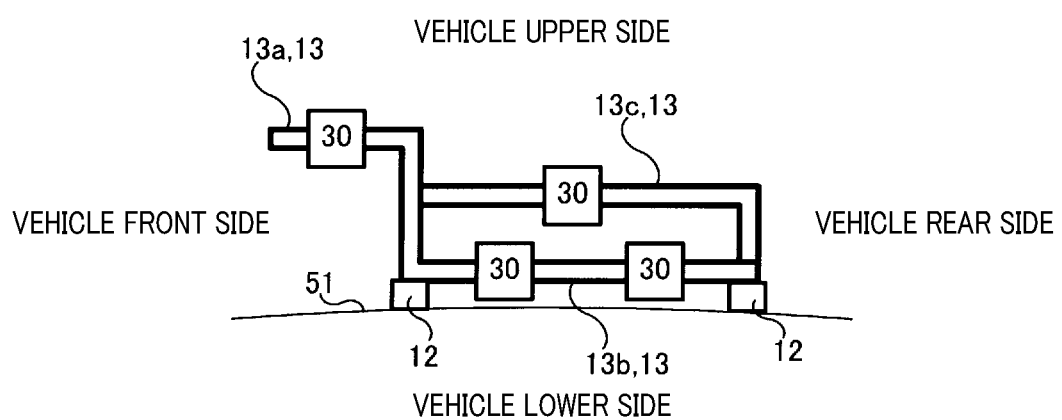
FIG. 12 is an explanatory diagram schematically illustrating a base viewed from a side of a vehicle, to show a configuration of a base according to another embodiment.
Figure 13:
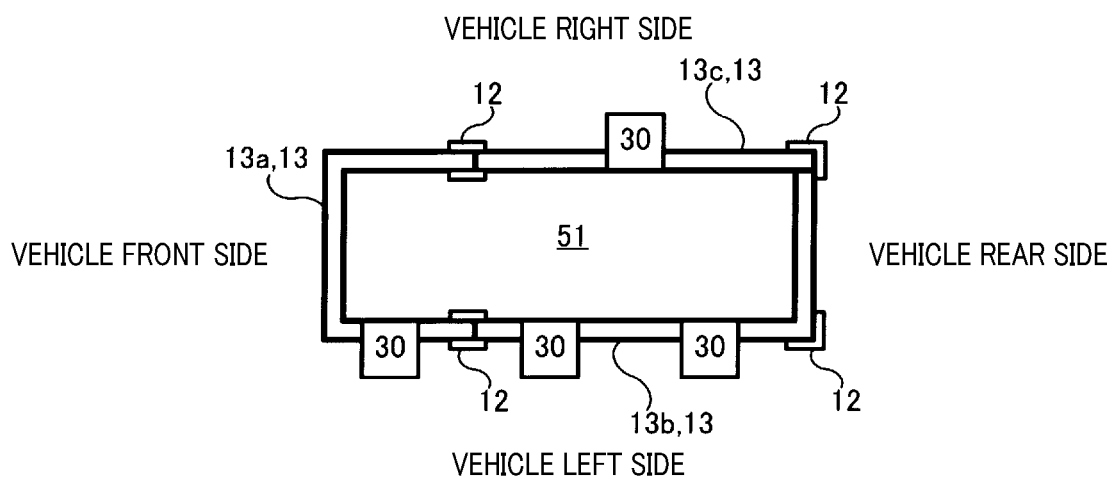
FIG. 13 is an explanatory diagram schematically illustrating the base viewed from above the vehicle, to show the configuration of the base according to the other embodiment shown in FIG. 12.
Figure 14:
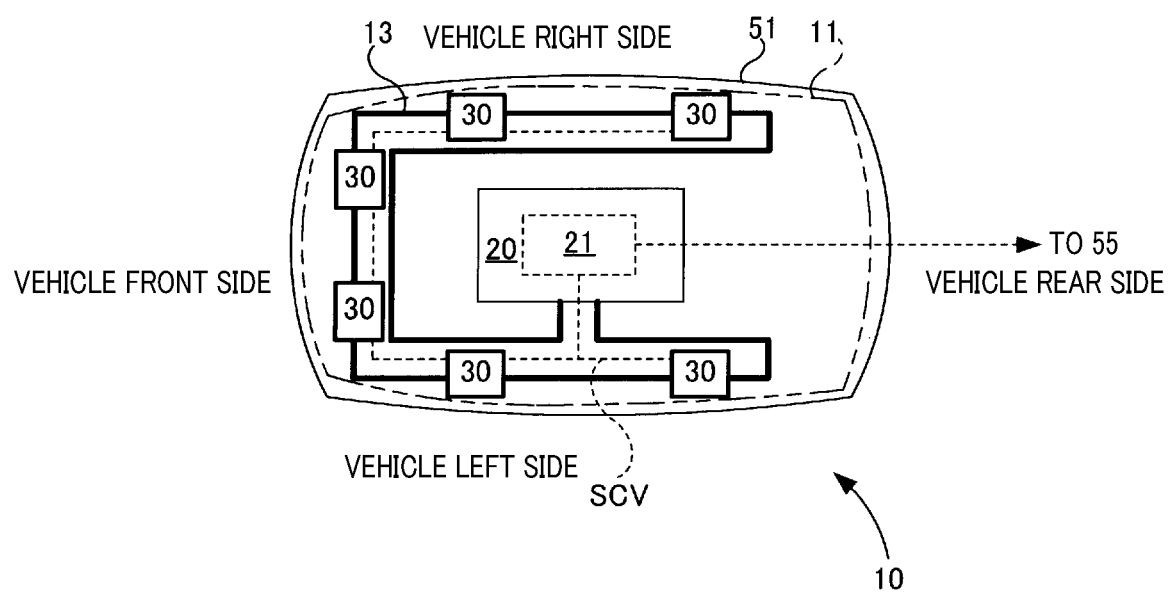
FIG. 14 is an explanatory diagram schematically illustrating a base viewed from above a vehicle, to show a configuration of a base according to another embodiment.

FIG. 12 schematically shows the base 13 when the vehicle 50 is viewed from the side. FIG. 13 schematically shows the base 13 when the vehicle 50 is viewed from above. The base 13 shown in FIG. 12 and FIG. 13 has a stepped structure, that is, a stair-like three-dimensional structure. The base 13 includes a base 13a that configures a first step, a base 13b that configures a second step, and a base 13c that configures a third step. The base 13 increases in height, in steps, in order of the base 13b, the base 13c, and the base 13a.

Here, a number of steps of the base 13 may be two steps, or four or more steps. The base 13 may also have a three-dimensional structure that is hierarchical, that is, has two or more layers over the overall base 13. Furthermore, the base 13 may be configured such that the number of layers or steps increases from the front of the vehicle 50 towards the center or the rear.

Alternatively, the base 13 may be configured such that the number of layers or steps increases from the rear of the vehicle 50 towards the center or the front. Moreover, the base 13 may be configured such that the number of layers or steps increases from one side of the vehicle 50 towards the center or the other side. Furthermore, an arbitrary number of layers or steps may be used in an arbitrary location of the base 13.

In general, the detection module 30 for detecting an area that is farther from the vehicle 50 or an outer circumferential area of the vehicle 50 is preferably arranged in a higher layer position or a higher step position. The base 13 according to the present embodiment is capable of actualizing this need.

In addition, as shown in FIG. 13, the base 13 that has an open structure that has an open end may be used. For example, even in cases in which the base 13 that has a closed structure cannot be used in terms of a relationship with another object that is arranged on the roof 51 of the vehicle 50, the base 13 according to the present embodiment is capable of solving this issue. Here, the number of layers or steps, and the closed or open structure of the base 13 may be arbitrarily combined.

(3) According to the above-described embodiments, the wiring SCV is arranged inside the base 13. However, the wiring SCV may be arranged outside the base 13 or along the base 13. In this case, the wiring SCV is electrically connected to the connected portion 132 by being inserted through an insertion opening that is provided for insertion of the wiring SCV into the base 13 and has water resistance. In this case, wiring of the wiring SCV is facilitated.

The present disclosure is described above based on the embodiments and variation examples. However, the above-described embodiments are provided to facilitate understanding of the present disclosure and do not limit the present disclosure. The present disclosure may be modified and improved without departing from the spirit and scope of claims of the disclosure.

In addition, the present disclosure includes equivalents thereof. For example, embodiments that correspond to technical features in each aspect described in the summary of the disclosure and technical features in the variation examples may be replaced and combined as appropriate to solve some or all of the above-described issued or to achieve some or all of the above-described effects. Furthermore, the technical features may be omitted as appropriate unless described as a requisite in the present specification.

What is claimed is:

1. A measurement apparatus unit that is mounted to a vehicle, the measurement apparatus unit comprising:
a base; and
a plurality of detection modules that are mounted to the base,
wherein each of the plurality of detection modules includes:
a casing that includes a mounting portion for detachably mounting each of the plurality of detection modules to the base, the mounting portion having a shape that is common among the plurality of detection modules; and
a detector that is housed in the casing, and
wherein the base has a hollow frame structure in which at least one of a first wiring and a second wiring is provided,
the first wiring being used for communication with the plurality of detection modules, and
the second wiring being used for power supply to the plurality of detection modules.

2. The measurement apparatus unit according to claim 1, wherein:
the base includes
a mounted portion to which the mounting portion of each of the plurality of detection modules is mounted, and
a connected portion that is provided in the mounted portion, has a connection structure that is common among each type of the detector included in each of the plurality of detection modules, and is connected to the at least one of the first wiring and the second wiring.

3. The measurement apparatus unit according to claim 1, wherein:
the base includes
a mounted portion to which the mounting portion of each of the plurality of detection modules is mounted, and
a connected portion that is provide in the mounted portion, has a connection structure that is common among all types of the detector included in each of the plurality of detection modules, and is connected to the at least one of the first wiring and the second wiring.

4. The measurement apparatus unit according to claim 2, further comprising:

an optical axis regulating portion that regulates an optical axis of the detector included in each of the plurality of detection modules.

5. The measurement apparatus unit according to claim 3, further comprising:
an optical axis regulating portion that regulates an optical axis of the detector included in each of the plurality of detection modules.

6. The measurement apparatus unit according to claim 2, wherein:
the connected portion includes a water-resistant and dust-resistant structure.

7. The measurement apparatus unit according to claim 3, wherein:
the connected portion includes a water-resistant and dust-resistant structure.

8. The measurement apparatus unit according to claim 4, wherein:
the connected portion includes a water-resistant and dust-resistant structure.

9. The measurement apparatus unit according to claim 5, wherein:
the connected portion includes a water-resistant and dust-resistant structure.

10. The measurement apparatus unit according to claim 1, further comprising:
a lock mechanism that prevents the plurality of detection modules from being removed from the base and is unlocked in response to a control signal that is transmitted from the vehicle.

11. The measurement apparatus unit according to claim 2, further comprising:
a lock mechanism that prevents the plurality of detection modules from being removed from the base and is unlocked in response to a control signal that is transmitted from the vehicle.

12. The measurement apparatus unit according to claim 3, further comprising:
a lock mechanism that prevents the plurality of detection modules from being removed from the base and is unlocked in response to a control signal that is transmitted from the vehicle.

13. The measurement apparatus unit according to claim 2, wherein:
each of the plurality of detection modules includes a connecting portion that has a structure that is common among each type of the detector included in each of the plurality of detection modules, and a water-resistant and dust-resistant structure corresponding to the connected portion.

14. The measurement apparatus unit according to claim 3, wherein:
each of the plurality of detection modules includes a connecting portion that has a structure that is common among each type of the detector included in each of the plurality of detection modules, and a water-resistant and dust-resistant structure corresponding to the connected portion.

15. The measurement apparatus unit according to claim 4, wherein:
each of the plurality of detection modules includes a connecting portion that has a structure that is common among each type of the detector included in each of the plurality of detection modules, and a water-resistant and dust-resistant structure corresponding to the connected portion.

16. The measurement apparatus unit according to claim 5, wherein:
each of the plurality of detection modules includes a connecting portion that has a structure that is common among each type of the detector included in each of the plurality of detection modules, and a water-resistant and dust-resistant structure corresponding to the connected portion.

17. The measurement apparatus unit according to claim 1, wherein:
the base has a closed structure or an open structure, and further has a planar structure or a three-dimensional structure.

18. The measurement apparatus unit according to claim 2, wherein:
the base has a closed structure or an open structure, and further has a planar structure or a three-dimensional structure.

19. The measurement apparatus unit according to claim 3, wherein:
the base has a closed structure or an open structure, and further has a planar structure or a three-dimensional structure.

* * * * *